United States Patent
Yoda

(10) Patent No.: US 11,288,597 B2
(45) Date of Patent: Mar. 29, 2022

(54) COMPUTER-READABLE RECORDING MEDIUM HAVING STORED THEREIN TRAINING PROGRAM, TRAINING METHOD, AND INFORMATION PROCESSING APPARATUS

(71) Applicant: FUJITSU LIMITED, Kawasaki (JP)

(72) Inventor: Katsuhiro Yoda, Kodaira (JP)

(73) Assignee: FUJITSU LIMITED, Kawasaki (JP)

( * ) Notice: Subject to any disclaimer, the term of this patent is extended or adjusted under 35 U.S.C. 154(b) by 380 days.

(21) Appl. No.: 16/393,104

(22) Filed: Apr. 24, 2019

(65) Prior Publication Data

US 2019/0370682 A1   Dec. 5, 2019

(30) Foreign Application Priority Data

Jun. 4, 2018   (JP) .............................. JP2018-107200

(51) Int. Cl.
  *G06N 20/00*   (2019.01)
(52) U.S. Cl.
  CPC .................................. *G06N 20/00* (2019.01)
(58) Field of Classification Search
  CPC .............................. G06N 20/00; G06N 20/10
  USPC ......................................................... 706/12
  See application file for complete search history.

(56) References Cited

U.S. PATENT DOCUMENTS 10,929,744 B2 * 2/2021 Li .......................... G06N 3/063

FOREIGN PATENT DOCUMENTS

| JP | 59-197936 | 11/1984 | |
|---|---|---|---|
| JP | 2000-231476 | 8/2000 | |
| WO | WO-2016182671 A1 * | 11/2016 | ............... G06N 3/10 |

OTHER PUBLICATIONS

Fixed Point Quantization of Deep Convolutional Networks (Year: 2016).*
Going Deeper with Embedded FPGA Platform for Convolutional Neural Network (Year: 2016).*

* cited by examiner

*Primary Examiner* — Omar F Fernandez Rivas
*Assistant Examiner* — Em N Trieu
(74) *Attorney, Agent, or Firm* — Fujitsu Patent Center

(57) ABSTRACT

A non-transitory computer-readable recording medium stores therein a program for causing a computer to execute a process for, in repeatedly training a given training model, repeatedly training the training model a given number of times by using a numerical value of a floating-point number, the numerical value being a parameter of the training model or training data of the training model, or any combination thereof; and, after the training by using the numerical value of the floating-point number, repeatedly training the training model by using a numerical value of a fixed-point number corresponding to a numerical value of the floating-point number obtained by the training.

13 Claims, 10 Drawing Sheets

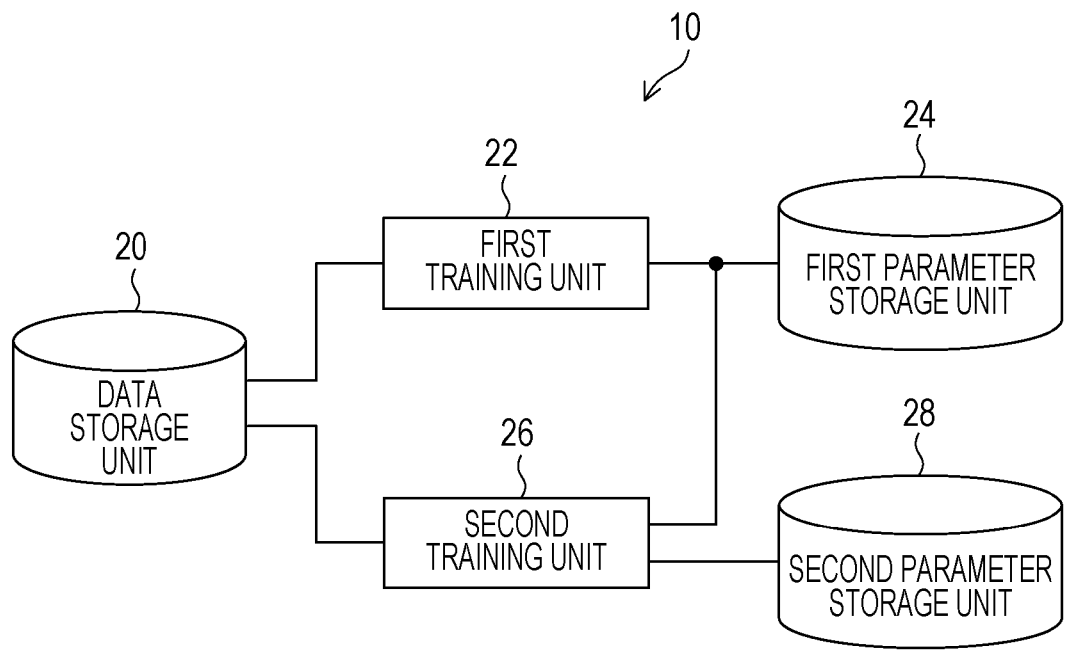

FIG. 4

| NUMBER OF REPETITIONS i | PARAMETER $W_0$ | ... | PARAMETER $W_l$ | ... | PARAMETER $W_L$ |
|---|---|---|---|---|---|
| 1 | $W_0(1)$ | ... | $W_l(1)$ | ... | $W_L(1)$ |
| 2 | $W_0(2)$ | ... | $W_l(2)$ | ... | $W_L(2)$ |
| ... | ... | ... | ... | ... | ... |
| M | $W_0(M)$ | ... | $W_l(M)$ | ... | $W_L(M)$ |

FIG. 5

| NUMBER OF REPETITIONS i | PARAMETER $W_0$ | ... | PARAMETER $W_l$ | ... | PARAMETER $W_L$ |
|---|---|---|---|---|---|
| M+1 | $W_{fix,0}(M+1)$ | ... | $W_{fix,l}(M+1)$ | ... | $W_{fix,L}(M+1)$ |
| M+2 | $W_{fix,0}(M+2)$ | ... | $W_{fix,l}(M+2)$ | ... | $W_{fix,L}(M+2)$ |
| ... | ... | ... | ... | ... | ... |
| Z | $W_{fix,0}(Z)$ | ... | $W_{fix,l}(Z)$ | ... | $W_{fix,L}(Z)$ |

COMPUTER-READABLE RECORDING MEDIUM HAVING STORED THEREIN TRAINING PROGRAM, TRAINING METHOD, AND INFORMATION PROCESSING APPARATUS

CROSS-REFERENCE TO RELATED APPLICATION

This application is based upon and claims the benefit of priority of the prior Japanese Patent Application No. 2018-107200, filed on Jun. 4, 2018, the entire contents of which are incorporated herein by reference.

FIELD

The embodiments discussed herein are related to a computer-readable recording medium storing therein a training program, a training method, and an information processing apparatus.

BACKGROUND

A digital signal processing scheme that makes it possible for a fixed-point multiplication to be performed as required even in a multiplication of a fixed-point mode using a multiplier with which low order digits of a numerical value that is a target for calculation are cancelled is known. With this scheme, in a fixed-point multiplication circuit including a register that contains multipliers, a register that contains multiplicands, a multiplication circuit, and an accumulator, when a multiplication of integers is performed, in loading an integer multiplier and an integer multiplicand into the registers, the multiplier and multiplicand are loaded such that the digit positions thereof are shifted.

A fixed-point multiply-adder in which there is little increase in the hardware configuration and that improves the computational accuracy to the same extent as a floating-point multiply-adder is also known. This fixed-point multiply-adder includes a selector for input selection that selects and outputs either input data or feedback input data, and a multiplication circuit that performs a multiplication of multiplier data X, which is the selected output of the selector, and multiplicand data Y, which is coefficient input data. The fixed-point multiply-adder also includes an adder circuit in which the multiplication output of the multiplication circuit is used as a first addition input. The fixed-point multiply-adder also includes a data retention circuit that temporarily retains an addition output Z of the adder circuit and provide the addition output Z as the other addition input to the adder circuit. The fixed-point multiply-adder also includes a left bit-shift circuit that selectively bit shifts an addition output toward the most significant side, and a data storage device to which output data of the left bit-shift circuit is written and feedbacks read data to one input end of the selector.

Examples of the related art include Japanese Laid-open Patent Publication No. 59-197936, and Japanese Laid-open Patent Publication No. 2000-231476.

SUMMARY

According to an aspect of the embodiments, a non-transitory computer-readable recording medium stores therein a program for causing a computer to execute a process for, in repeatedly training a given training model, repeatedly training the training model a given number of times by using a numerical value of a floating-point number, the numerical value being a parameter of the training model or training data of the training model, or any combination thereof; and, after the training by using the numerical value of the floating-point number, repeatedly training the training model by using a numerical value of a fixed-point number corresponding to a numerical value of the floating-point number obtained by the training.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a schematic block diagram of an information processing apparatus according to the embodiments;

FIG. 2 is a diagram illustrating an example of a data format of training data that is stored in a data storage unit;

FIG. 4 is a diagram illustrating an example of data formats of parameters that are stored in a first parameter storage unit;

FIG. 5 is a diagram illustrating an example of data formats of parameters that are stored in a second parameter storage unit;

DESCRIPTION OF EMBODIMENTS

Figure 3:
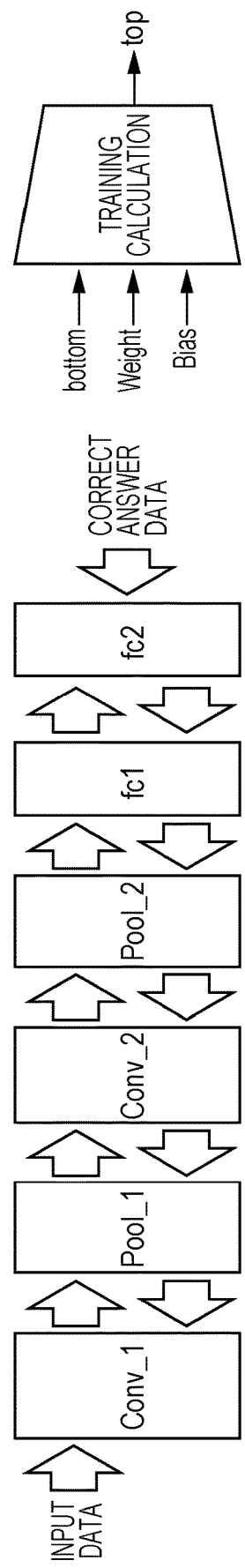
FIG. 3 is an illustrative diagram illustrating a convolutional neural network (CNN)

In learning parameters of a training model such as a neural network, a huge amount of computation is required, which provides loads such as computation loads and memory loads, increasing the training time for learning parameters. To address this, in order to reduce the training time for learning parameters, it is conceivable to represent a numerical value used in training by using a fixed-point number. Representing a numerical value used in learning as a fixed-point numerical reduces the data amount, reduces the loads such as computation loads and memory loads, and reduces the training time for learning parameters.

However, the fixed-point number is narrower in the range of representable numerical values than the floating-point number. Therefore, there is a problem in that, in a training process using a numerical value represented as a fixed-point number, the accuracy of a training result is low.

Hereinafter, exemplary embodiments of the disclosed technique will be described in detail with reference to the accompanying drawings.

Information Processing Apparatus According to First Embodiment

As illustrated in FIG. 1, an information processing apparatus 10 according to a first embodiment includes a data storage unit 20, a first training unit 22, a first parameter storage unit 24, a second training unit 26, and a second parameter storage unit 28.

In the data storage unit 20, training data for training a given training model is stored. The training data is, for example, stored in a table format as illustrated in FIG. 2. The training data is a combination of input data and correct answer data corresponding to the input data. In the embodiments, an example of using image data including red-green-blue (RGB) elements as input data will now be given.

In the table illustrated in FIG. 2, a data identifier (ID) representing identification information of each piece of data, and input data and correct answer data are stored in association with each other. In the example illustrated in FIG. 2, for example, data ID "00001", and input data "A1" and correct answer data "B1" are stored in association with each other.

The information processing apparatus 10 according to the embodiments uses training data stored in the data storage unit 20 to train a convolutional neural network (CNN), an exemplary training model. FIG. 3 is an illustrative diagram illustrating deep learning of a CNN.

The CNN illustrated in FIG. 3 is composed of layers Conv_1, Pool_1, Conv_2, Pool_2, fc1, and fc2. As illustrated in FIG. 3, in a deep learning process for the CNN, correct answer data corresponding to input data is given, the input data is input from the left side (of FIG. 3) to the CNN, and the processing result of each layer is propagated in the right direction (forward propagation). Then, output data for the input data is compared with correct answer data, and the resulting difference is propagated in the left direction (back propagation).

For example, a convolution operation of the Conv_1 layer is performed by performing a multiply-accumulate operation of the parameter of Conv_1 on the input data. Each of the layers Conv_1, Pool_1, Conv_2, Pool_2, fc1, and fc2 retains a parameter. When the operation on the highest layer (fc2 in FIG. 3) of the CNN is complete, a result of the operation is compared with the correct answer data and, based on a comparison result, the parameter of each layer is updated.

In each layer of the CNN, a calculation on the right side of FIG. 3 is performed. For example, in performing a training calculation, a multiply-accumulate operation of "bottom", which is input data or output data from the previous layer, and "Weight", which is a parameter, is performed. In accordance with the sum of a result of the multiply-accumulate operation and "Bias", output data "top" is output.

The information processing apparatus 10 according to the embodiments trains the CNN by using a numerical value of a floating-point number a given number of times and thereafter trains the CNN by using a numerical value of a fixed-point number.

In the embodiments, performing a training process on a mini-batch one time is assumed as one repetition. The mini-batch refers to simultaneously providing plural pieces of image data to a training process. For example, a mini-batch "16" means that 16 pieces of image data are simultaneously provided to a training process. Therefore, for example, when there are 65536 pieces of image data, all the image data is input for 4096 iterations.

The first training unit 22 first represents training data stored in the data storage unit 20 by using a floating-point number. The first training unit 22 then trains a CNN a predetermined number of times by using a numerical value of the floating-point number. The first training unit 22 then obtains a parameter $W_I$ of each layer of the CNN as a training result. The letter I is an index for identifying each layer of the CNN. The parameter $W_I$ is a parameter vector expressed by the following expression (1). The subscript "Wn" represents the number of elements in the vector of the parameter $W_I$.

$$W_I = \{W_{0,I}, W_{1,I}, \ldots, W_{Wn,I}\} \quad (1)$$

During the training process repeatedly performed, the first training unit 22 sequentially stores the parameter $W_I$ as a training result in association with the number of repetitions i in the first parameter storage unit 24.

When the training process of the CNN has been repeated C times, C being a predetermined number, the first training unit 22 completes the training process of the CNN by using a numerical value of a floating-point number. The number C is, for example, predetermined by the user. Based on an existing simulation result for the CNN, the number of repetitions that suffices for training accuracy may be set as C.

In the first parameter storage unit 24, as illustrated in FIG. 4, the number of repetitions i representing the number of repetitions of the training process and the parameter $W_I$ obtained by the training process performed by the first training unit 22 are stored in association with each other. The digit in parentheses of the parameter $W_I$ corresponds to the number of repetitions i.

The second training unit 26 converts the parameter $W_I$ obtained by training using a numerical value of a floating-point number to a parameter $W_{fix,I}$ of a fixed-point number.

For example, for the parameter $W_I$ of each layer of the CNN, the second training unit 26 selects the maximum value and the minimum value of elements of the parameter $W_I$ of the layer.

For the parameter $W_I$ of each layer of the CNN, the second training unit 26 then calculates an integer $N_{WI}$ by using the maximum value and the minimum value among elements of the parameter $W_I$ of the layer, according to the following expression (2). The integer $N_{WI}$ is calculated for the respective parameter $W_I$ of each layer.

$$N_{WI} = \text{Ceil}(\log_2(\max(vmax, (-1*vmin)))) \quad (2)$$

where vmax is the maximum value and vmin is the minimum value.

The function "Ceil" in the above expression (2) returns a numerical value rounded up to the nearest integer. For example, Ceil (1.5) gives a value of 2 as output.

For the parameter $W_I$ of each layer, the second training unit 26 then calculates a point position $Q(W_I)$ in accordance with the parameter $W_I$ by using the calculated integer $N_{WI}$ and the width WL of data to be operated, according to the following expression (3).

$$Q(W_I) = N_{WI} - WL - 1 \quad (3)$$

The data width WL represents the width of the fixed point. For example, for a 16-bit fixed point, the data width WL is "16".

Next, for the parameter $W_I$ of each layer, the second training unit 26 converts the parameter $W_I$ of a floating-point number to a parameter $W_{fix,I}$ of a fixed-point number by using the parameter $W_I$ and the point position $Q(W_I)$ in accordance with the parameter $W_I$, according to the following expression (4).

$$W_{fix,I} = \text{StocRnd}(W_I / 2^{Q(W_I)}) \quad (4)$$

The data width WL in the above expression (3) is set in advance to a value of 8 bits, 16 bits, or the like. StocRnd( ) in the above expression (4) is a function for performing stochastic rounding, and, for example, with StocRnd (0.4), "0" will be output with a probability of 60% and "1" will be output with a probability of 40%. The parameter $W_{fix,I}$ of each layer represented in a fixed-point format is a vector in the format as expressed by the following expression (5).

$$W_{fix,I} = \{W_{fix,0,I}, W_{fix,1,I}, \ldots W_{fix,Wn,I}\} \quad (5)$$

The second training unit 26 repeatedly performs learning of the parameter $W_{fix,I}$ of each layer of the CNN by using the parameter $W_{fix,I}$ of each layer represented in the fixed-point format.

In repeatedly performing learning of the parameter $W_{fix,I}$ of each layer of the CNN, the second training unit 26 according to the embodiments dynamically changes the point position of the fixed-point number.

The range of numerical values that are representable in a fixed-point format is narrower than the range of numerical values that are representable in a floating-point format. Therefore, when a training process is performed by using a fixed-point number, there are some cases where, for example, an overflow occurs.

Therefore, in the embodiments, each time a training process is repeated, it is recorded whether an overflow has occurred. The second training unit 26 according to the embodiments calculates an overflow percentage in a given time period and changes the point position of each numerical value in accordance with the overflow percentage. The overflow percentage is the percentage of the number of operations in which an overflow has occurred to the total number of operations. The overflow percentage is an example of the statistical information of the disclosed techniques.

For example, if the overflow percentage is greater than a threshold, the second training unit 26 subtracts one from the point position $Q(W_I)$. The second training unit 26 performs learning of the parameter $W_{fix,I}$ of a fixed-point number in accordance with the point position $Q(W_I)$ resulting from subtraction of one.

If a value that is a predetermined multiple of the overflow percentage is less than or equal to the threshold, the second training unit 26 adds one to the point position $Q(W_I)$. The second training unit 26 performs learning of the parameter $W_{fix,I}$ of a fixed-point number in accordance with the point position $Q(W_I)$ resulting from addition of one. In the embodiments, an example in which the predetermined multiple is "two multiples" will be given; however, the predetermined multiple may be any multiples.

If the value of two multiples of the overflow percentage is greater than the threshold and the overflow percentage is less than or equal to the threshold, the second training unit 26 repeats the training process without changing the point position $Q(W_I)$.

Thus, by using a fixed-point number corresponding to a suitable point number, the parameter $W_{fix,I}$ of each layer of the CNN may be learned.

While the training process is repeatedly performed, the second training unit 26 sequentially stores the parameter $W_{fix,I}$, which a training result, in association with the number of repetitions i in the second parameter storage unit 28.

In the second parameter storage unit 28, as illustrated in FIG. 5, the number of repetitions i, which represents the number of repeating the training process, and the parameter $W_{fix,I}$, which is obtained by the training process by the second training unit 26, are stored in association with each other. The number in parentheses of the parameter $W_{fix,I}$ corresponds to the number of repetitions i.

Figure 6:
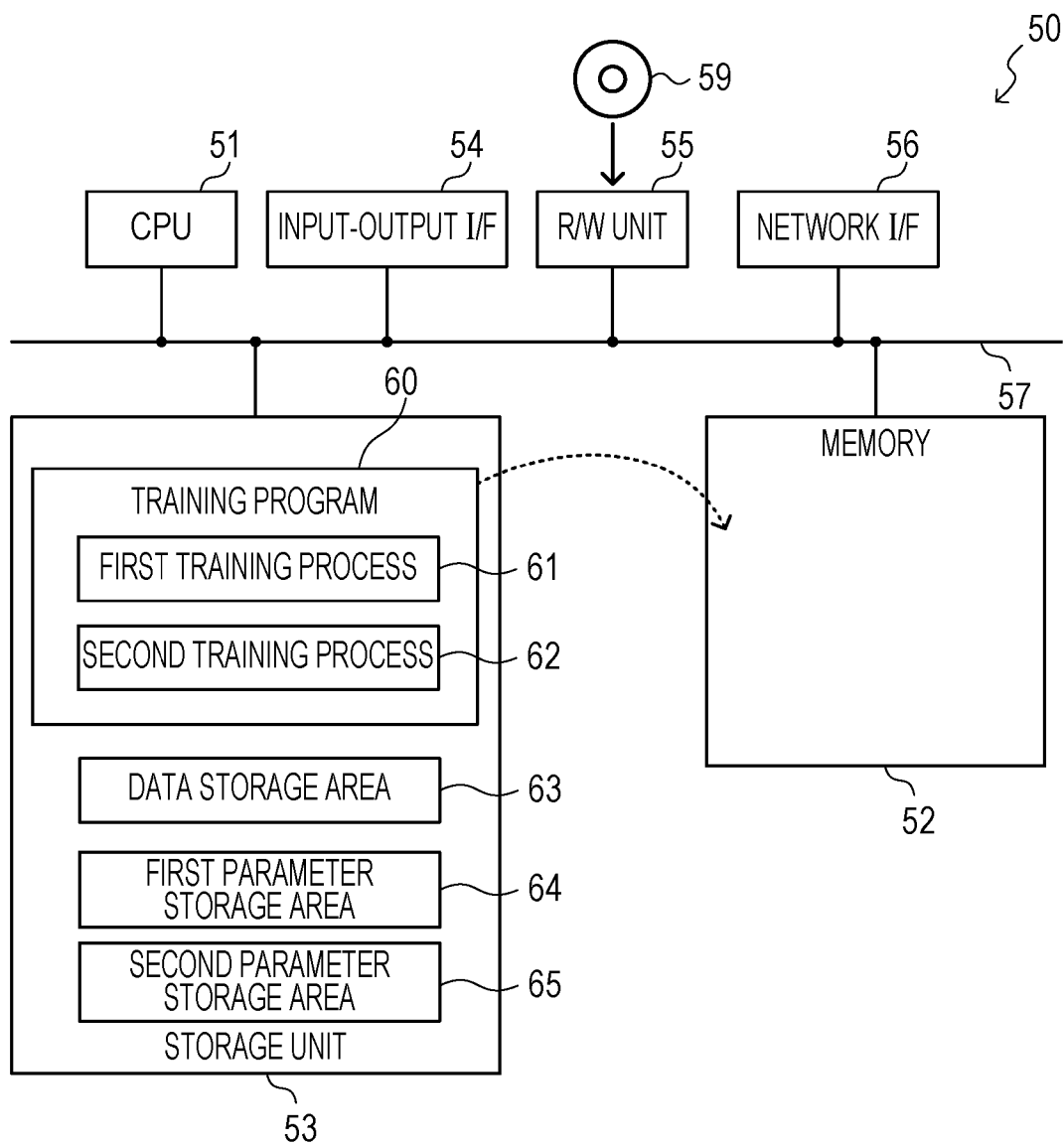
FIG. 6 is a block diagram illustrating a schematic configuration of a computer that functions as an information processing apparatus according to an embodiment.

The information processing apparatus 10 may be, for example, implemented by a computer 50 illustrated in FIG. 6. The computer 50 includes a central processing unit (CPU) 51, a memory 52, which functions as a temporary storage area, and a nonvolatile storage unit (memory) 53. The computer 50 includes an input-output interface (I/F) 54, to which an input-output device is coupled, and a read/write (R/W) unit 55, which controls reading and writing from and to a recording medium 59. The computer 50 includes a network I/F 56, which is coupled to a network such as the Internet. The CPU 51, the memory 52, the storage unit 53, the input-output I/F 54, the R/W unit 55, and the network I/F 56 are coupled via a bus 57. The CPU 51 may be any one of a single CPU, a multi CPU, and a multi-core CPU.

The storage unit 53 may be implemented by a hard disk drive (HDD), a solid state drive (SSD), a flash memory, or the like. In the storage unit 53 implemented as a storage medium, a training program 60 for causing the computer 50 to function as the information processing apparatus 10 is stored. The training program 60 includes a first training process 61 and a second training process 62. In the data storage area 63, information included in the data storage unit 20 is stored. In the first parameter storage area 64, information included in the first parameter storage unit 24 is stored. In the second parameter storage area 65, information included in the second parameter storage unit 28 is stored.

The CPU 51 reads the training program 60 from the storage unit 53 to load the training program 60 into the memory 52, and sequentially executes processes included in the training program 60. The CPU 51 operates as the first training unit 22 illustrated in FIG. 1 by executing the first training process 61. The CPU 51 also operates as the second training unit 26 illustrated in FIG. 1 by executing the second training process 62. The CPU 51 also reads information from the data storage area 63 and loads information of the data storage unit 20 into the memory 52. The CPU 51 also reads information from the first parameter storage area 64 and loads information of the first parameter storage unit 24 into the memory 52. The CPU 51 also reads information from the second parameter storage area 65 and loads information of the second parameter storage unit 28 into the memory 52. Thus, the computer 50 that has executed the training program 60 functions as the information processing apparatus 10. The CPU 51 that executes the training program 60, which is software, is hardware.

Figure 7:
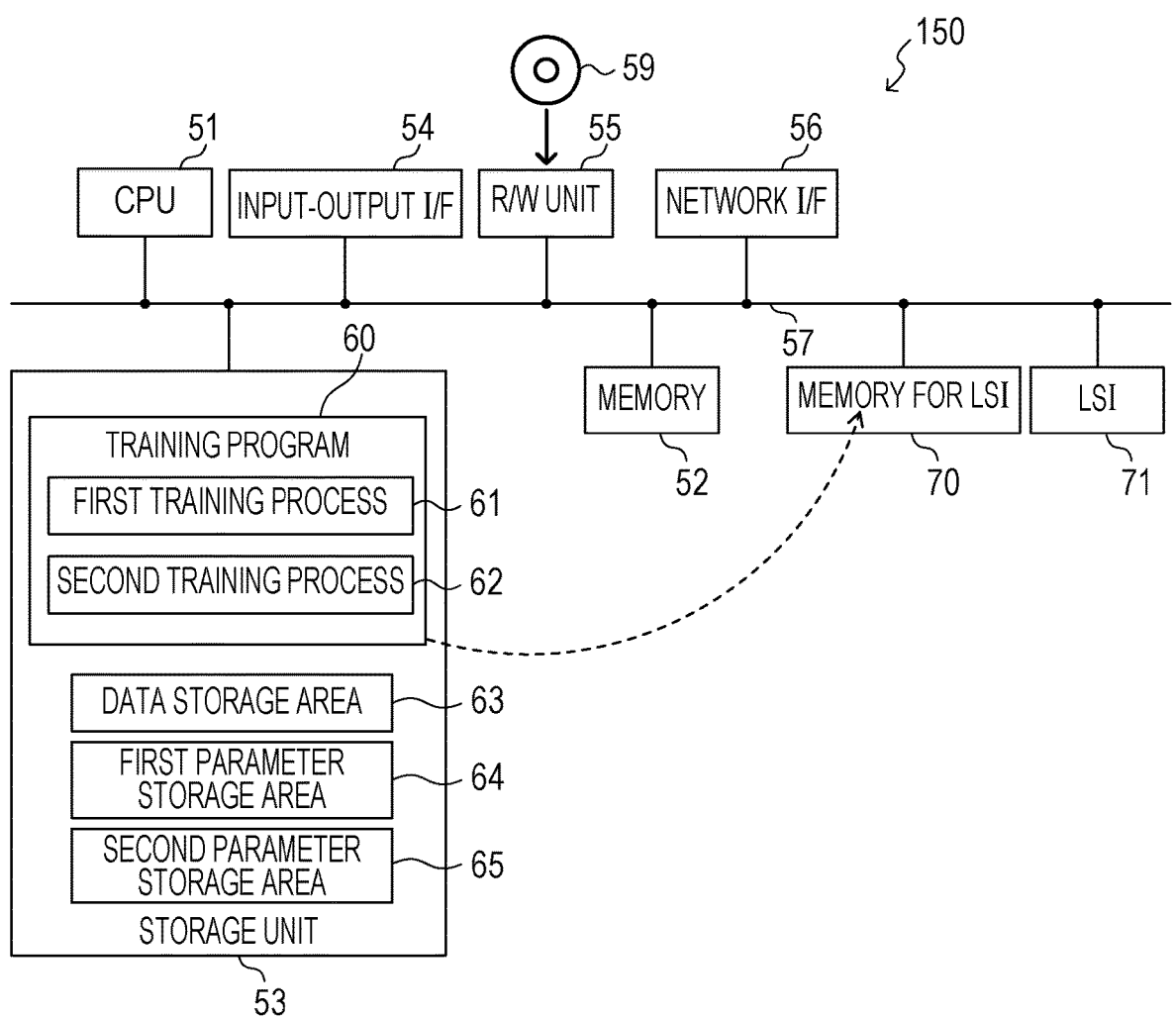
FIG. 7 is a block diagram illustrating a schematic configuration of a computer that functions as an information processing apparatus according to an embodiment.

The information processing apparatus 10 may be, for example, implemented by a computer 150 illustrated in FIG. 7. The computer 150 further includes a memory for a large-scale integrated circuit (LSI) 70, and an LSI 71. In the LSI 71, a processor for dynamically changing the point position of a fixed-point number is included. The operations of the LSI 71 are controlled via the bus 57 by the CPU 51. The CPU 51 reads the training program 60 from the storage unit 53, loads the training program 60 into the memory for LSI 70, and sequentially executes processes included in the training program 60 to control the LSI 71.

In the LSI 71, a control core (not illustrated) may further be included. In this case, for example, the CPU 51 and a control core performs communication processing via the bus 57, and the control core that has obtained control information output from the CPU 51 controls the entire LSI 71.

The functions implemented by the training program 60 are implemented by, for example, a semiconductor integrated circuit, more specifically an application specific integrated circuit (ASIC) or the like. The functions can also be implemented by a field-programmable gate array (FPGA). The CPU 51, the ASIC, and the FPGA may be collectively called processors.

The operations of the information processing apparatus 10 according to the embodiments will be described. Upon input of plural pieces of training data to the information processing apparatus 10, the plural pieces of training data are stored in the data storage unit 20. Upon receiving an instruction signal to begin training, the information processing apparatus 10 executes a training process routine illustrated in FIG. 8.

In step S10, the first training unit 22 trains the CNN by using a numerical value of a floating-point number a predetermined number of times. A pre-training process in step S10 is implemented by a pre-training process routine illustrated in FIG. 9.

Figure 9:
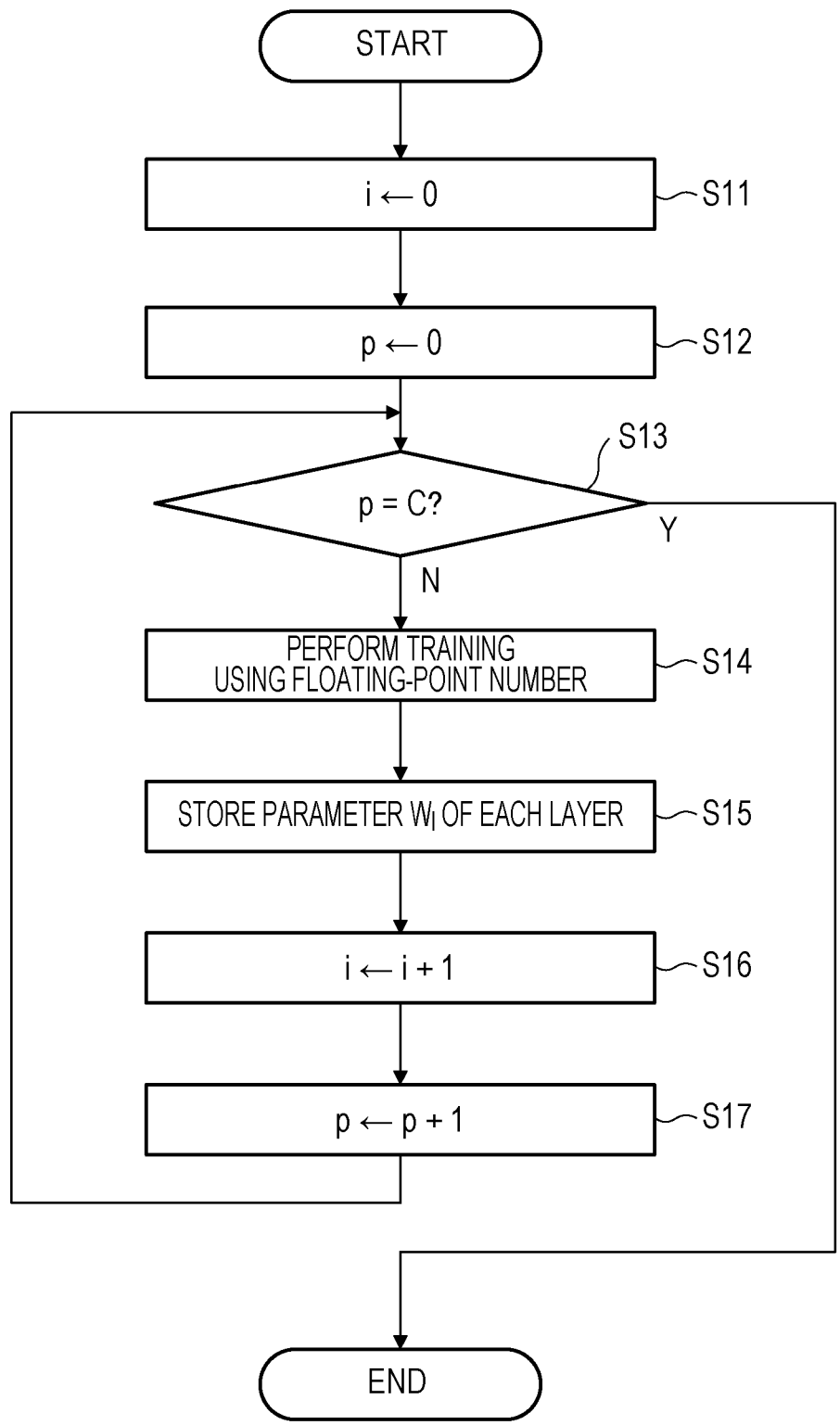
FIG. 9 is a flowchart illustrating an example of a pre-training process routine according to a first embodiment.

In step S11 of the pre-training process routine illustrated in FIG. 9, the first training unit 22 substitutes zero for the number of repetitions i.

In step S12, the first training unit 22 substitutes zero for the number of repetitions p of training with a floating-point number.

In step S13, the first training unit 22 determines whether the number of repetitions p updated in the above step S12 or the previous step S17 is equal to a predetermined number of repetitions C. If the number of repetitions p is equal to the predetermined number of repetitions C, the process routine in FIG. 9 terminates. If, however, the number of repetitions p is not equal to the predetermined number of repetitions C, the process proceeds to step S14.

In step S14, the first training unit 22 performs training for learning the parameter $W_I$ of each layer of the CNN by using a numerical value of a floating-point number.

In step S15, the first training unit 22 stores the parameter $W_I$ of each layer of the CNN obtained in step S14 in association with the number of repetitions i in the first parameter storage unit 24.

In step S16, the first training unit 22 increments the number of repetitions i by one.

In step S17, the first training unit 22 increments the number of repetitions p of the training with a floating-point number by one.

Figure 8:
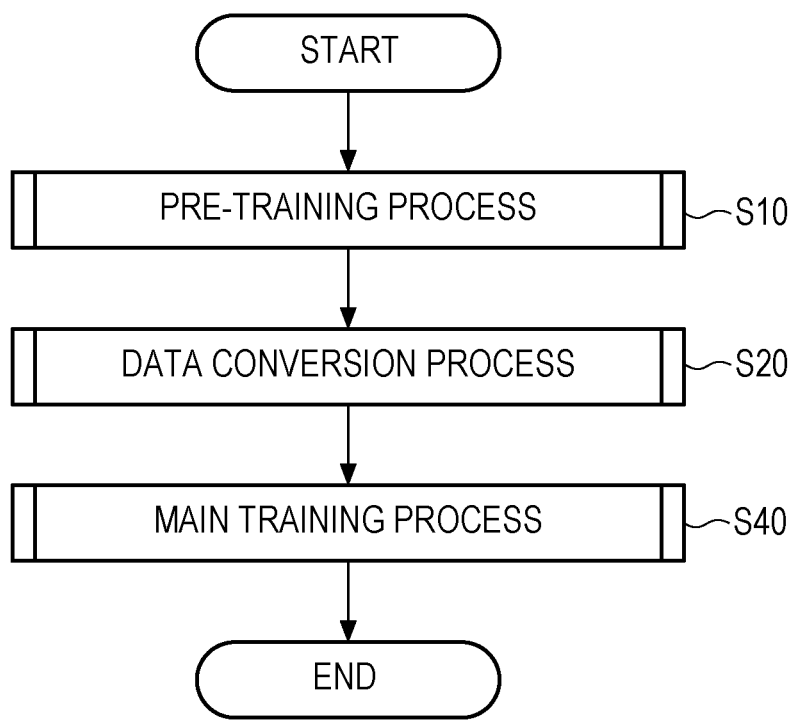
FIG. 8 is a flowchart illustrating an example of a training process routine according to the embodiments.

In the determination in step S13, if the number of repetitions p is equal to the predetermined number of repetitions C, the pre-training process routine in FIG. 9 terminates and the process returns to the training process routine in FIG. 8.

Figure 10:
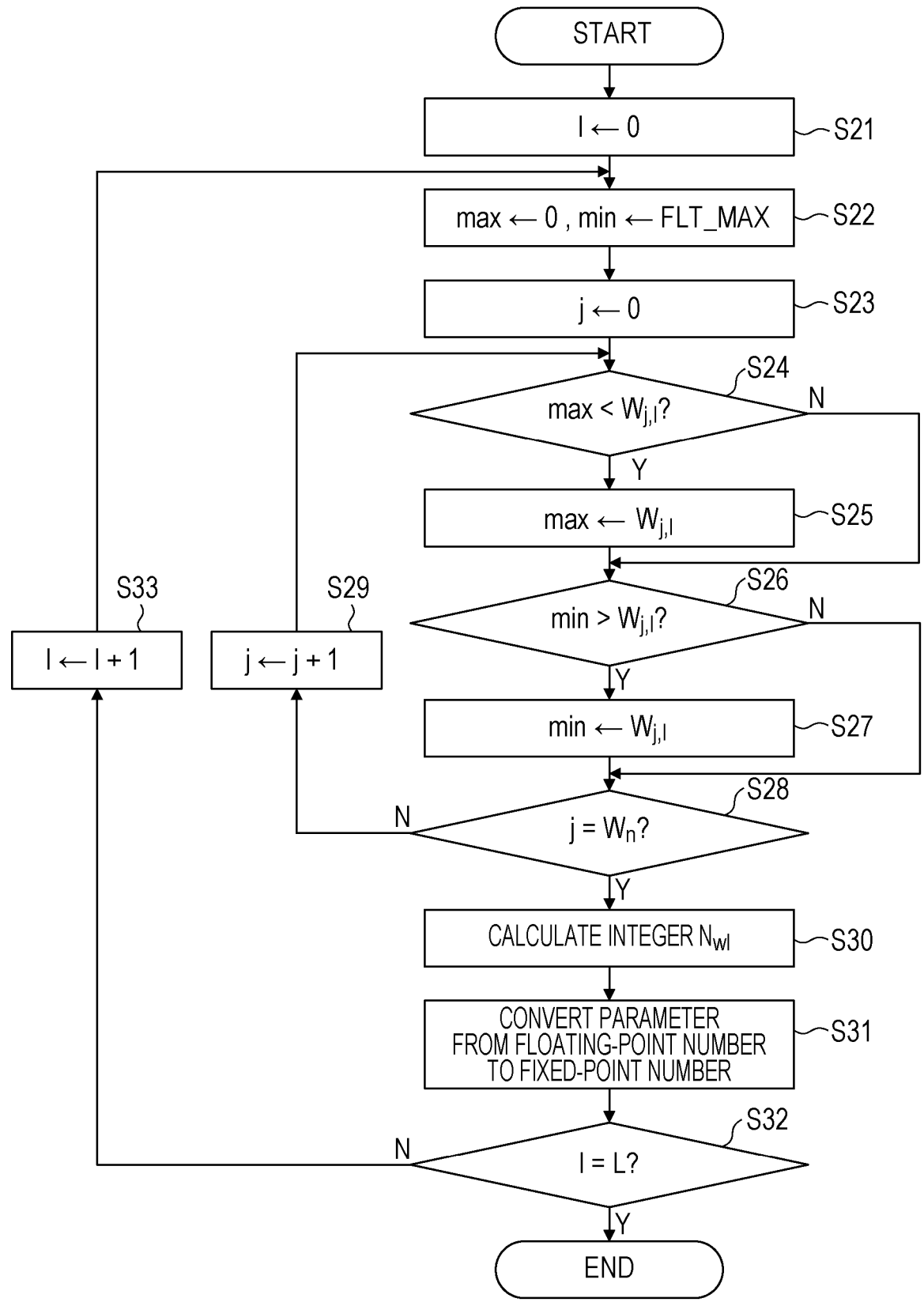
FIG. 10 is a flowchart illustrating an example of a data conversion process routine according to the embodiments.

In step S20 of the training process routine in FIG. 8, the second training unit 26 converts the parameter $W_I$ obtained by training using a numerical value of a floating-point number to the parameter $W_{fix,I}$ of a fixed-point number. The data conversion process in step S20 is implemented by a data conversion process routine illustrated in FIG. 10.

In step S21, the second training unit 26 substitutes zero for a variable I for identifying the layer of the CNN.

In step S22, the second training unit 26 substitutes zero for the variable vmax. Also, in step S22, the second training unit 26 substitutes a predetermined initial value FLT_MAX for the variable vmin.

In step S23, the second training unit 26 substitutes zero for a variable j for identifying each element $\{W_{0,I}, W_{1,I}, \ldots, W_{Wn,I}\}$ of the parameter $W_I$ of the layer I of the CNN.

In step S24, the second training unit 26 determines whether the jth element $W_{j,I}$ of the parameter $W_I$ corresponding to the layer I of the CNN is greater than the variable vmax. If the jth element $W_{j,I}$ of the parameter $W_I$ corresponding to the layer I is greater than the variable vmax, the process proceeds to step S25. If, however, the jth element $W_{j,I}$ of the parameter $W_I$ corresponding to the layer I is less than or equal to the variable vmax, the process proceeds to step S26.

In step S25, the second training unit 26 substitutes the jth element $W_{j,I}$ of the parameter $W_I$ corresponding to the layer I of the CNN for the variable vmax.

In step S26, the second training unit 26 determines whether the jth element $W_{j,I}$ of the parameter $W_I$ corresponding to the layer I is less than the variable vmin. If the jth element $W_{j,I}$ of the parameter $W_I$ corresponding to the layer I is less than the variable vmin, the process proceeds to step S27. If, however, the jth element $W_{j,I}$ of the parameter $W_I$ corresponding to the layer I is greater than or equal to the variable vmin, the process proceeds to step S28.

In step S27, the second training unit 26 substitutes the jth element $W_{j,I}$ of the parameter $W_I$ corresponding to the layer I of the CNN for the variable vmin.

In step S28, the second training unit 26 determines whether the variable j is equal to the number of all elements $W_n$ of the parameter $W_I$ corresponding to the layer I. If the variable j is equal to the number of all elements $W_n$, the process proceeds to step S30. If, however, the variable j is not equal to the number of all elements $W_n$, the process proceeds to step S29, where the variable j is incremented by one and the process returns to step S24.

In step S30, the second training unit 26 calculates the integer $N_{WI}$ corresponding to the parameter $W_I$ of the layer I of the CNN by using the variable vmax obtained in step S25 and the variable vmin obtained in step S27, according to the above expression (2).

In step S31, the second training unit 26 calculates the point position $Q(W_I)$ in accordance with the parameter $W_I$ by using the integer $N_{WI}$ calculated in step S30 and the width WL of data to be operated, according to the above expression (3). In step S31, then, the second training unit 26 converts the parameter $W_I$ of a floating-point number to the parameter $W_{fix,I}$ of a fixed-point number by using the parameter $W_I$ and the point position $Q(W_I)$, according to the above expression (4).

In step S32, the second training unit 26 determines whether the variable I is equal to the number of all layers L of the CNN. If the variable I is equal to the number of all layers L, the data conversion process routine in FIG. 10 terminates and the process returns to the training process routine in FIG. 8. If, however, the variable I is not equal to the number of all layers L, the process proceeds to step S33, where the variable I is incremented by one and the process returns to step S22.

Figure 11:
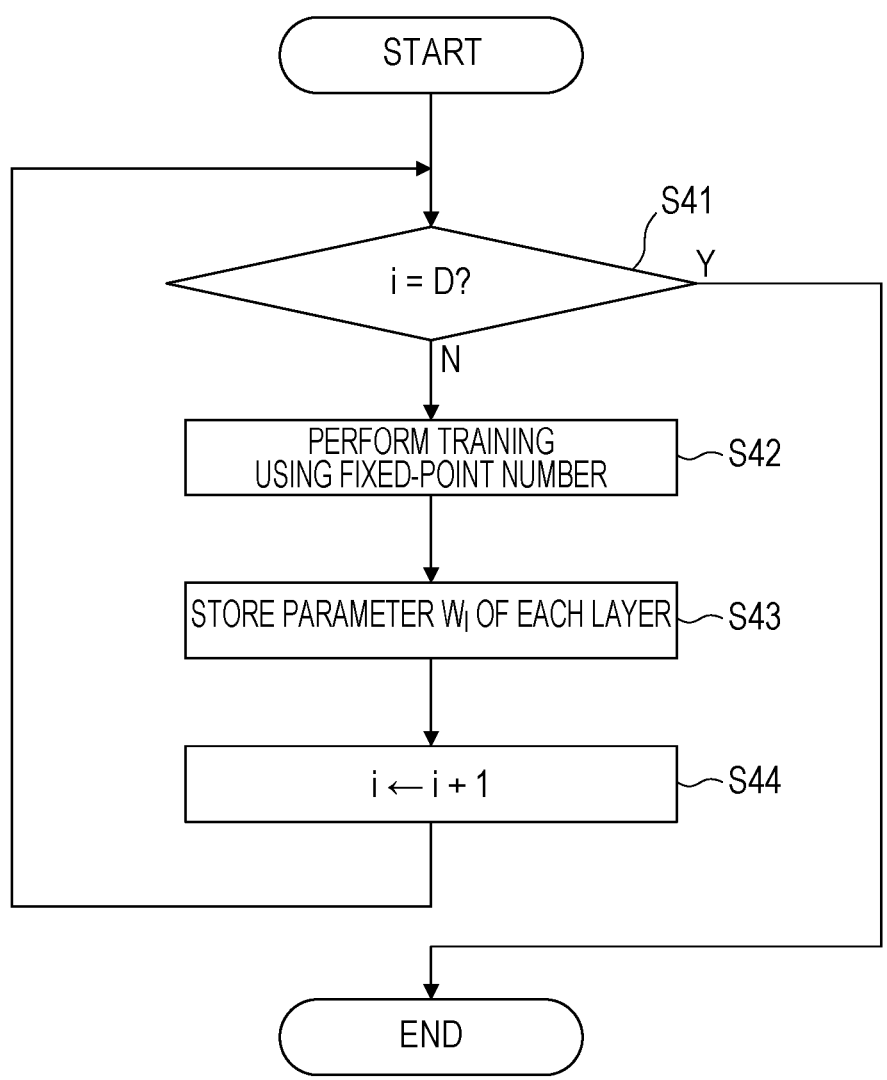
FIG. 11 is a flowchart illustrating an example of an actual learning process routine according to the embodiments.

In step S40 of the training process routine in FIG. 8, the second training unit 26 repeatedly performs learning of the parameter $W_{fix,I}$ of each layer of the CNN by using the parameter $W_{fix,I}$ of each layer represented in the fixed-point format obtained in step S20. The main training process in step S40 is implemented by a main training process routine illustrated in FIG. 11.

In step S41, the second training unit 26 determines whether the number of repetitions i is equal to a predetermined total number of trainings D. If the number of repetitions i is equal to the total number of trainings D, the main training process routine in FIG. 11 terminates.

In step S42, the second training unit 26 performs training of the parameter $W_{fix,I}$ of each layer of the CNN by using the parameter $W_{fix,I}$ of each layer represented in the fixed-point format obtained in step S20. In the training process in step S42, the parameter $W_{fix,I}$ of each layer of the CNN is learned while the point position of each numerical value is being changed in accordance with the overflow percentage.

In step S43, the second training unit 26 stores the parameter $W_{fix,I}$ of each layer of the CNN obtained in step S42 in association with the number of repetitions i in the second parameter storage unit 28.

In step S44, the second training unit 26 increments the number of repetitions i by one and returns to step S41.

As described above, an information processing apparatus according to the first embodiment trains the CNN a given number of times by using a numerical value of a floating-point number. After training using the numerical value of the floating-point number, the information processing apparatus trains the CNN by using a numerical value of a fixed-point number corresponding to a numerical value of a floating-point number obtained by the training. Thus, in training a given training model, a training result with high accuracy may be obtained in a short time.

In the case where all the repeated trainings are performed by using fixed point numbers and training is performed while changing the point position of a fixed-point number, the training process has advanced before a proper point position is obtained by adjustment, decreasing the accuracy of training results. In this case, it is required to obtain statistical information for adjusting the point position, and therefore the training time increases. In contrast, the information processing apparatus according to the first embodiment trains the CNN a given number of times by using a numerical value of a floating-point number and thereafter trains the CNN by using a numerical value of a fixed-point number, which enables training results with high accuracy to be obtained in a short time. Using a value obtained by training the CNN by using a floating-point number as an initial value of a training process using a fixed-point number enables an initial value in performing training with a fixed point number to be appropriately set.

Information Processing Apparatus of Second Embodiment

A second embodiment will now be described. The second embodiment differs from the first embodiment in that, based on a change between a point position corresponding to a numerical value in the ith training and a point position corresponding to a numerical value in an (i−1)th training, the process switches from training with a floating-point number to training with a fixed-point number.

Each time training with a floating-point number is repeated K times, the first training unit 22 in the second embodiment calculates the point position $Q(W_I)$ in accordance with the parameter $W_I$ of each layer obtained by the training with a floating-point number, according to the above expression (3). Here, K is predetermined, for example, by the user. In order to retain data for use in switching from training with a floating-point number to training with a fixed-point number, for example, the first training unit 22 stores parameters in an external storage unit (not illustrated) each time training with a floating-point number is repeated K times.

For example, each time training with a floating-point number is repeated K times, the first training unit 22 calculates a point position $Q(W_I, i)$ of the parameter $W_I$ of each layer obtained by ith training and a point position $Q(W_I, i-1)$ of the parameter $W_I$ of each layer obtained in the (i−1)th training.

Next, each time training with the floating-point number is repeated K times, the first training unit 22 calculates a sum SUM of the absolute values of differences between the point position $Q(W_I, i-1)$ and the point position $Q(W_I, i)$ for the parameter $W_I$ of each layer. The sum SUM is calculated by the following expression (7).

$$SUM = |Q(W_0, i-1) - Q(W_0, i)| + \qquad (7)$$
$$|Q(W_1, i-1) - Q(W_1, i)| + \ldots + |Q(W_L, i-1) - Q(W_L, i)|$$

Each time training with the floating-point number is repeated K times, the first training unit 22 then calculates ΔSUM representing a variation in the point position in the training process, according to the following expression (8).

$$\Delta SUM = SUM/K \qquad (8)$$

The first training unit 22 then calculates a difference Diff obtained by subtracting $\Delta SUM_Y$ calculated when training with the floating-point number is previously repeated K times from $\Delta SUM_X$ calculated when training with the floating-point number is currently repeated K times, according to the following expression (9).

$$Diff = \Delta SUM_X - \Delta SUM_Y \qquad (9)$$

If the calculated difference Diff is greater than a threshold, the first training unit 22 trains the CNN by using a numerical value of a fixed-point number. If the calculated difference Diff is less than or equal to the threshold, the first training unit 22 continues training the CNN by using a numerical value of a floating-point number. In the embodiments, an example of the threshold that is set to zero will be given.

When the difference Diff between the current $\Delta SUM_X$ and the previous $\Delta SUM_Y$ is less than or equal to zero, it is indicated that the variation in point position is decreased, which is a state where the point position for training is approaching an ideal point position. In contrast, when the difference D between the current $\Delta SUM_X$ and the previous $\Delta SUM_Y$ is greater than zero, it is indicated that the variation in point position begins to increase, which is a state where the point position for training is moving away from an ideal point position.

Therefore, when the calculated difference D is greater than zero, the first training unit 22 in the second embodiment switches to training of the CNN by using a numerical value of a fixed point. When the difference Diff is greater than zero, the parameter obtained when training with the floating-point number is previously repeated K times is considered to be closer to an ideal than the parameter obtained when training with the floating-point number is currently repeated K times. Therefore, the first training unit 22 reads, from an external storage unit (not illustrated), the parameter obtained when training with the floating-point number is previously repeated K times, and uses the read parameter to train the CNN by using a numerical value of a fixed-point number.

Figure 12:
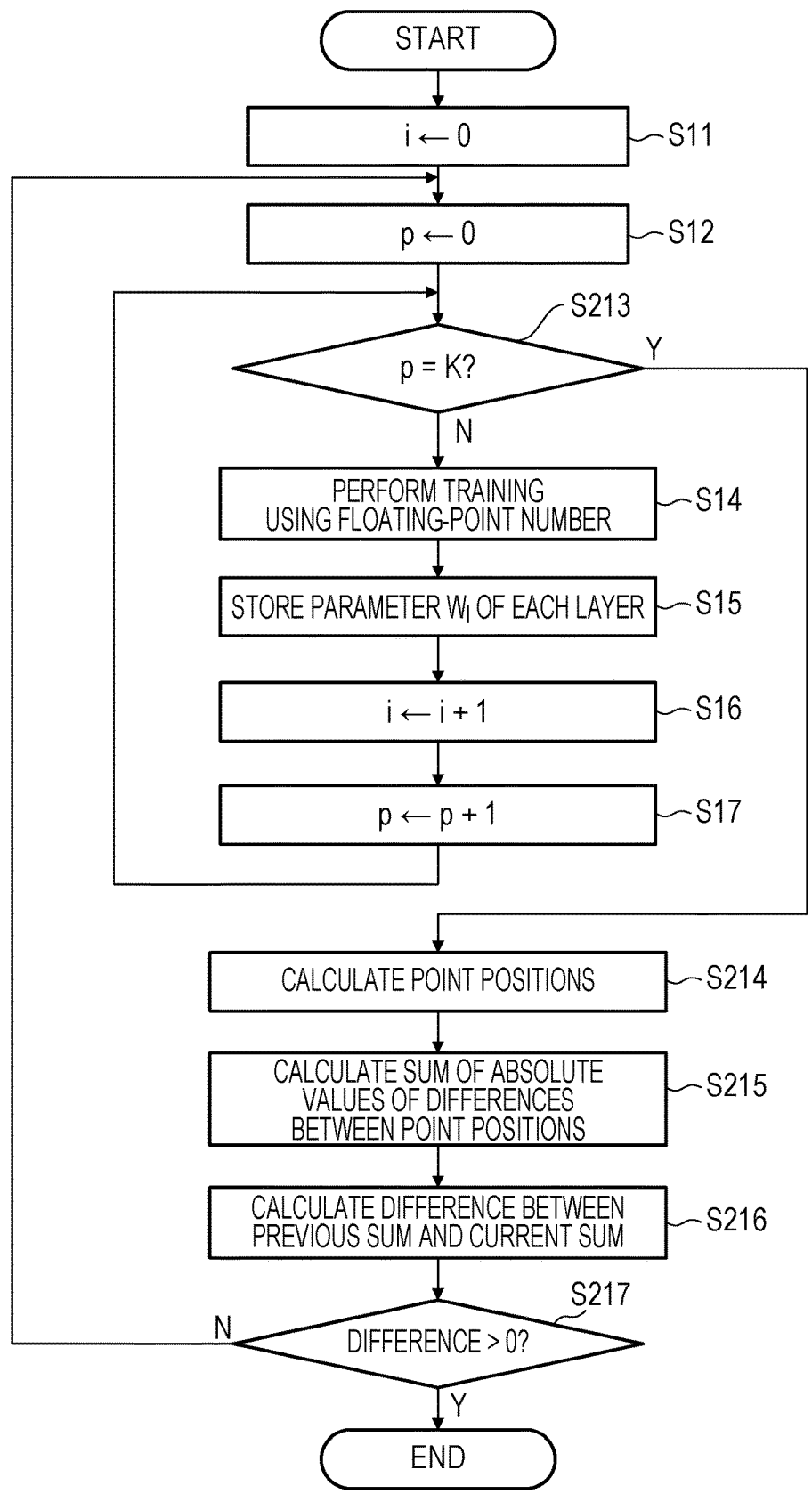
FIG. 12 is a flowchart illustrating an example of a pre-learning process routine according to a second embodiment.

The operations of the information processing apparatus 10 according to the second embodiment will now be described. Upon input of plural pieces of training data to the information processing apparatus 10, the plural pieces of training data are stored in the data storage unit 20. Upon receiving an instruction signal to begin training, the information processing apparatus 10 executes the above-described training process routine illustrated in FIG. 8. The above-described pre-training process in step S10 in FIG. 8 is implemented by a pre-training process routine illustrated in FIG. 12.

In step S213, if the number of repetitions p of training with a floating-point number is equal to the predetermined number of repetitions K, the first training unit 22 in the second embodiment proceeds to step S214.

In step S214, the first training unit 22 calculates the point position $Q(W_I, i-1)$ of the parameter $W_I$ of each layer obtained by (i−1)th training and the point position $Q(W_I, i)$ of the parameter $W_I$ of each layer obtained by ith training.

In step S215, the first training unit 22 calculates the sum SUM of the absolute values of differences between point positions by using the point position $Q(W_I, i-1)$ and the point position $Q(W_I, i)$ calculated in step S214, according to the above expression (7). In step S215, the first training unit 22 calculates $\Delta SUM_X$ representing a variation in the point position in the training process, according to the above expression (8).

In step S216, the first training unit 22 calculates the difference Diff obtained by subtracting $\Delta SUM_Y$ calculated when training with the floating-point number is previously repeated K times from $\Delta SUM_X$ calculated in the above step S215, according to the above expression (9).

In step S217, the first training unit 22 determines whether the difference Diff calculated in step S216 is greater than zero. If the difference Diff calculated in step S216 is greater than zero, the pre-training process routine illustrated in FIG. 12 terminates and training of the CNN by using a numerical value of a fixed-point number begins. If, however, the difference Diff calculated in step S216 is less than or equal to zero, the process returns to step S12, where training of the CNN by using the numerical value of the floating-point number continues.

As described above, each time training with a floating-point number is repeated, the information processing apparatus according to the second embodiment calculates the absolute value of a difference between a point position in accordance with the numerical value of the ith training with the floating-point number and a point position in accordance with the numerical value of the (i−1)th training. When the value obtained by subtracting the absolute value of a difference calculated when training with the floating-point number is previously repeated from the absolute value of a difference calculated when training with the floating-point number is currently repeated is greater than a threshold, a training model is trained by using a numerical value of a fixed-point number. Thus, switching from a training process with a floating-point number to a training process with a fixed-point number may be performed at a suitable timing.

The manner in which each program is stored (installed) in advance in a storage unit has been described above; however, embodiments are not limited to this. A program according to the disclosed techniques may be provided in a form in which the program is recorded on a recording medium such as a compact disc read-only memory (CD-ROM), digital-versatile disc ROM (DVD-ROM), or universal serial bus (USB) memory.

All documents, patent applications, and technical standards mentioned herein are incorporated herein by reference to the same extent as if each individual document, patent application, and technical standard were individually and specifically indicated to be incorporated by reference.

Modifications of each embodiment will now be described.

Although, in the above embodiments, a description has been given of the case where the training model is a CNN, embodiments are not limited to this. For example, the training model may be a neural network of another type.

Although, in the above embodiments, a description has been given of the case where a numerical value represented in the floating-point format and a numerical value represented in the fixed-point format are parameters of each layer of the CNN, embodiments are not limited to this. For example, training data is represented as a floating-point number or a fixed-point number, and after the parameter has been learned by using training data represented as the floating-point number, the parameter may be learned by using training data represented as the fixed-point number.

Although, in the above embodiments, a description has been given of the case where, in performing a training process by using a fixed-point number, an overflow percentage, which is an example of statistical information regarding a process using a numerical value of a fixed-point number, is used, embodiments are not limited to this. For example, as an example of the statistical information, an underflow percentage representing the number of operations in which an underflow has occurred to the total number of operations may be used.

Although, in the above embodiments, a description has been given of the case where, in performing a training process by using a fixed-point number, the point position is dynamically changed, embodiments are not limited to this. In performing a training process by using a fixed-point number, the training process may be performed without changing the point position.

Although, in the above second embodiment, a description has been given of the case where when the difference Diff between the current $\Delta SUM_X$ and the previous $\Delta SUM_Y$ is less than or equal to zero, switching from training with a floating-point number to training with a fixed-point number is performed, embodiments are not limited to this. A determination method regarding switching from training with a floating-point number to training with a fixed-point number may be any method by which it can be determined that the change in the point position caused by training using a floating-position point number has converged to some extent. For example, when the difference between the (i−1)th point position and the ith point position is less than or equal to a threshold, switching from training with a floating-point number to training with a fixed-point number may be performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing therein a program for causing a computer to execute a process, the process comprising:

in repeatedly training a given training model, repeatedly training the training model a given number of times by using a numerical value of a floating-point number, the numerical value being a parameter of the training model or training data of the training model, or any combination thereof;

after the training by using the numerical value of the floating-point number, repeatedly training the training model by using a numerical value of a fixed-point number corresponding to a numerical value of the floating-point number obtained by the training;

calculating a point position in accordance with the numerical value in (i−1)th training with the floating-point number and a point position in accordance with the numerical value in ith training with the floating-point number;

based on a change between the point position in the ith training and the point position in the (i−1)th training, switching from training with the floating-point number to training with the fixed-point number; and in training the training model by using the numerical value of the fixed-point number, based on statistical information regarding a process using the numerical value of the fixed-point number, changing a point position in the fixed-point number and training the training model, the point position is calculated using an expression $Q(W_f)=N_{WT}-WL-1$, wherein $N_{WT}$ is a value rounded up to a nearest integer and WL is a width of data, and $N_{WT}$ is calculated using an expression $N_{WT}=Ceil(\log_2(\max(vmax, (-1*vmin)))$, wherein vmax is a maximum value of a parameter of $W_f$ and vmin is a minimum value of a parameter of $W_f$.

2. The non-transitory computer-readable recording medium according to claim 1, the process further comprising in training the training model by using the numerical value of the fixed-point number, calculating a point position in accordance with the numerical value in the training using the numerical value of the floating-point number, converting the numerical value of the floating-point number to a numerical value of a fixed-point number in accordance with the calculated point position, and training the training model by using the numerical value of the fixed-point number.

3. The non-transitory computer-readable recording medium according to claim 1, wherein the given number of times is a predetermined number of times.

4. The non-transitory computer-readable recording medium according to claim 1, the process further comprising each time training with the floating-point number is repeated, calculating, as the change, an absolute value of a difference between the point position in the ith training and the point position in the (i−1)th training, and when a value obtained by subtracting an absolute value of the difference calculated in previously repeating the training with the floating-point number from an absolute value of the difference calculated in currently repeating the training with the floating-point number is greater than a threshold, training the training model by using the numerical value of the fixed-point number in and after (i+1)th training.

5. The non-transitory computer-readable recording medium according to claim 2, wherein the training model is a neural network, the process further comprising, in calculating the point position in accordance with the numerical value in training using the numerical value of the floating-point number, for each layer of the neural network, selecting an element that is greatest in absolute value among each element of a parameter vector of the layer, and, in accordance with the selected greatest element, calculating a point position of a value of each element of the parameter vector.

6. A training method executed by a computer, comprising:

in repeatedly training a given training model, repeatedly training the training model a given number of times by using a numerical value of a floating-point number, the numerical value being a parameter of the training model or training data of the training model, or any combination thereof;

after the training by using the numerical value of the floating-point number, repeatedly training the training model by using a numerical value of a fixed-point number corresponding to a numerical value of the floating-point number obtained by the training;

calculating a point position in accordance with the numerical value in (i−1)th training with the floating-point number and a point position in accordance with the numerical value in ith training with the floating-point number;

based on a change between the point position in the ith training and the point position in the (i−1)th training, switching from training with the floating-point number to training with the fixed-point number; and in training the training model by using the numerical value of the fixed-point number, based on statistical information regarding a process using the numerical value of the fixed-point number, changing a point position in the fixed-point number and training the training model, the point position is calculated using an expression $Q(W_f)=N_{WT}-WL-1$, wherein $N_{WT}$ is a value rounded up to a nearest integer and WL is a width of data, and $N_{WT}$ is calculated using an expression $N_{WT}=Ceil(\log_2(\max(vmax, (-1*vmin)))$, wherein vmax is a maximum value of a parameter of $W_f$ and vmin is a minimum value of a parameter of $W_f$.

7. The training method according to claim 6, the method further comprising in training the training model by using the numerical value of the fixed-point number, calculating a point position in accordance with the numerical value in the training using the numerical value of the floating-point number, converting the numerical value of the floating-point number to a numerical value of a fixed-point number in accordance with the calculated point position, and training the training model by using the numerical value of the fixed-point number.

8. The training method according to claim 6, wherein the given number of times is a predetermined number of times.

9. The training method according to claim 6, the method further comprising each time training with the floating-point number is repeated, calculating, as the change, an absolute value of a difference between the point position in the ith training and the point position in the (i−1)th training, and when a value obtained by subtracting an absolute value of the difference calculated in previously repeating the training with the floating-point number from an absolute value of the difference calculated in currently repeating the training with the floating-point number is greater than a threshold, training the training model by using the numerical value of the fixed-point number in and after (i+1)th training.

10. The training method according to claim 7, wherein the training model is a neural network, the process further comprising, in calculating the point position in accordance with the numerical value in training using the numerical value of the floating-point number, for each layer of the neural network, selecting an element that is greatest in absolute value among each element of a parameter vector of the layer, and, in accordance with the selected greatest element, calculating a point position of a value of each element of the parameter vector.

11. An information processing apparatus, comprising:
a memory; and
a processor coupled to the memory and the processor configured to:
in repeatedly training a given training model, repeatedly train the training model a given number of times by using a numerical value of a floating-point number, the numerical value being a parameter of the training model or training data of the training model, or any combination thereof;
after the training by using the numerical value of the floating-point number, repeatedly train the training model by using a numerical value of a fixed-point number corresponding to a numerical value of the floating-point number obtained by the training;
calculate a point position in accordance with the numerical value in (i−1)th training with the floating-point number and a point position in accordance with the numerical value in ith training with the floating-point number;
based on a change between the point position in the ith training and the point position in the (i−1)th training, switch from training with the floating-point number to training with the fixed-point number; and
in training the training model by using the numerical value of the fixed-point number, based on statistical information regarding a process using the numerical value of the fixed-point number, change a point position in the fixed-point number and training the training model, the point position is calculated using an expression $Q(W_I) = N_{WT} - WL - 1$, wherein $N_{WT}$ is a value rounded up to a nearest integer and WL is a width of data and $N_{WT}$ is calculated using an expression $N_{WT} = \mathrm{Ceil}(\log_2(\max(\mathrm{vmax}, (-1*\mathrm{vmin}))$, wherein vmax is a maximum value of a parameter of $W_I$ and vmin is a minimum value of a parameter of $W_I$.

12. The information processing apparatus according to claim 11, wherein in training the training model by using the numerical value of the fixed-point number, the processor calculates a point position in accordance with the numerical value in the training using the numerical value of the floating-point number, converting the numerical value of the floating-point number to a numerical value of a fixed-point number in accordance with the calculated point position, and train the training model by using the numerical value of the fixed-point number.

13. The information processing apparatus according to claim 11, wherein
the processor each time trains with the floating-point number is repeated,
calculating, as the change, an absolute value of a difference between the point position in the ith training and the point position in the (i−1)th training, and when a value obtained by subtracting an absolute value of the difference calculated in previously repeating the training with the floating-point number from an absolute value of the difference calculated in currently repeating the training with the floating-point number is greater than a threshold, training the training model by using the numerical value of the fixed-point number in and after (i+1)th training.

* * * * *